(12) United States Patent
Evenden et al.

(10) Patent No.: US 9,912,673 B2
(45) Date of Patent: Mar. 6, 2018

(54) METHOD AND DEVICE FOR SECURE NETWORK ACCESS

(71) Applicant: BRITISH TELECOMMUNICATIONS PUBLIC LIMITED COMPANY, London (GB)

(72) Inventors: Richard Joseph Evenden, London (GB); Francis James Scahill, London (GB); Simon Patrick Alexander Ringland, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/758,682

(22) PCT Filed: Dec. 31, 2013

(86) PCT No.: PCT/GB2013/000570
§ 371 (c)(1),
(2) Date: Jun. 30, 2015

(87) PCT Pub. No.: WO2014/102525
PCT Pub. Date: Jul. 3, 2014

(65) Prior Publication Data
US 2015/0373029 A1    Dec. 24, 2015

(30) Foreign Application Priority Data
Dec. 31, 2012  (EP) .................................... 12250191

(51) Int. Cl.
*H04L 29/06* (2006.01)
*G06F 21/44* (2013.01)
(Continued)

(52) U.S. Cl.
CPC ............ *H04L 63/105* (2013.01); *G06F 21/31* (2013.01); *G06F 21/44* (2013.01); *H04L 9/3226* (2013.01);
(Continued)

(58) Field of Classification Search
CPC ..... H04L 63/105; H04L 67/26; H04L 63/083; H04L 63/0876; H04L 9/3226;
(Continued)

(56) References Cited

U.S. PATENT DOCUMENTS 7,441,043 B1    10/2008  Henry et al.
8,719,952 B1 *   5/2014  Damm-Goossens . H04L 9/0825
                                                        380/285
(Continued)

FOREIGN PATENT DOCUMENTS

CN        101404643       4/2009
WO    WO 2010/064128      6/2010

OTHER PUBLICATIONS

International Search Report for PCT/GB2013/000570, dated Mar. 12, 2014, 3 pages.
(Continued)

*Primary Examiner* — Mahfuzur Rahman
(74) *Attorney, Agent, or Firm* — Nixon & Vanderhye P.C.

(57) ABSTRACT

In a hotspot Wi-Fi network, users can access the Internet from a variety of access points. The users' credentials are centrally authenticated within the network core to ensure they are allowed on the hotspot network. To improve security and provide selective access, a further authenticator function in the network manages access to private and/or restricted network resources.

16 Claims, 6 Drawing Sheets

Figure 1:
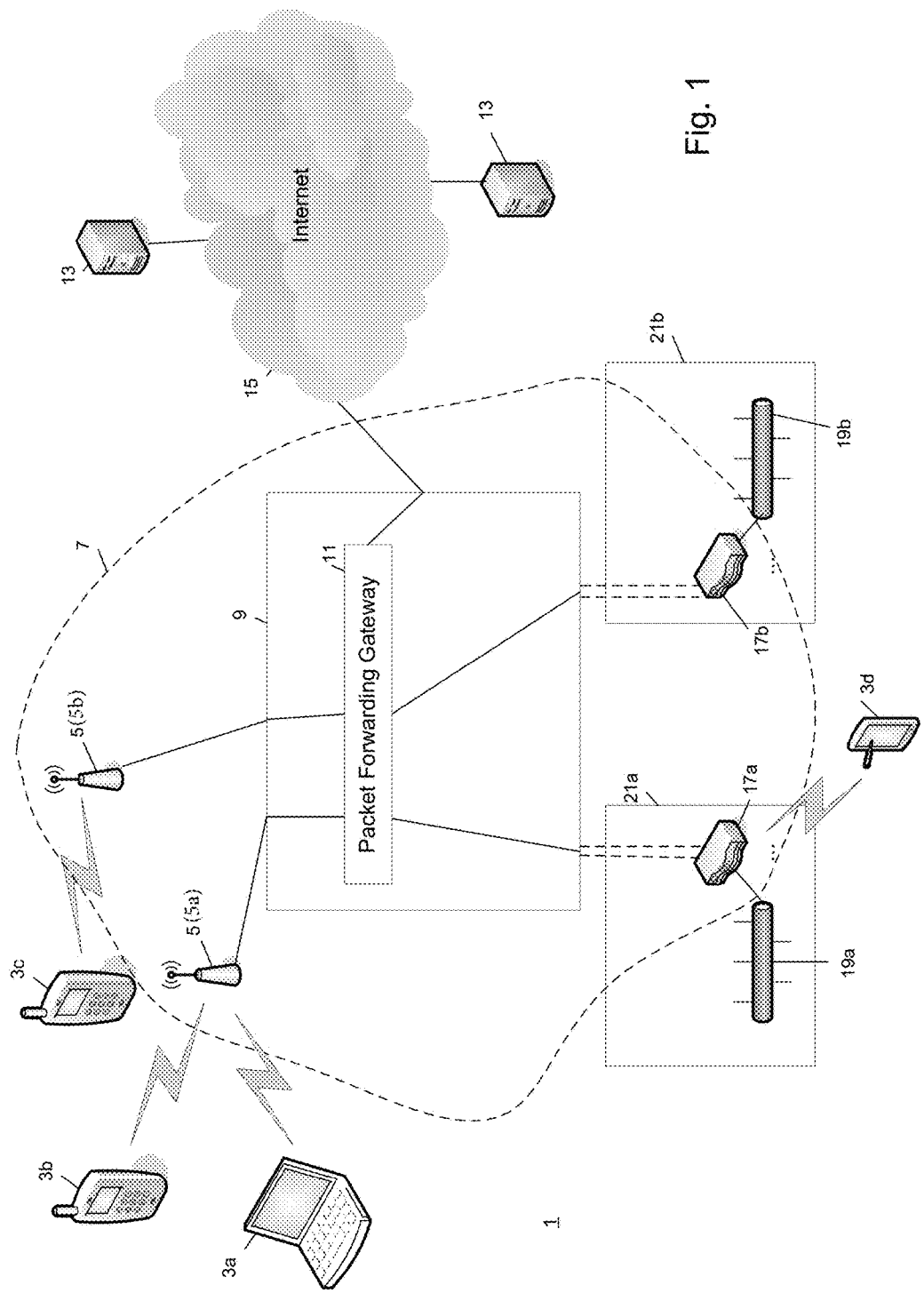

(51) Int. Cl.
*H04L 9/32* (2006.01)
*H04W 12/06* (2009.01)
*G06F 21/31* (2013.01)
*H04L 29/08* (2006.01)
*H04W 12/08* (2009.01)

(52) U.S. Cl.
CPC ........ *H04L 63/0272* (2013.01); *H04L 63/083* (2013.01); *H04L 63/0876* (2013.01); *H04L 67/26* (2013.01); *H04W 12/06* (2013.01); *H04W 12/08* (2013.01); *H04L 2463/082* (2013.01)

(58) Field of Classification Search
CPC ........ H04L 63/0272; H04L 2463/082; H04W 12/08; H04W 12/06; G06F 21/31; G06F 21/44
See application file for complete search history.

(56) References Cited

U.S. PATENT DOCUMENTS

| | | | |
|---|---|---|---|
| 8,739,260 B1* | 5/2014 | Damm-Goossens | H04W 12/06 726/4 |
| 9,813,398 B2* | 11/2017 | Li | H04L 63/08 |
| 2003/0054798 A1 | 3/2003 | Kobayashi | |
| 2005/0128975 A1 | 6/2005 | Kobayashi et al. | |
| 2006/0126645 A1* | 6/2006 | Devarapalli | H04L 63/0272 370/401 |
| 2008/0178264 A1 | 7/2008 | Keohane et al. | |
| 2010/0080238 A1* | 4/2010 | Allan | H04L 12/4662 370/401 |
| 2010/0263032 A1* | 10/2010 | Bhuyan | H04L 63/061 726/7 |
| 2011/0093932 A1* | 4/2011 | Wei | H04L 63/0281 726/4 |
| 2011/0158207 A1* | 6/2011 | Alberth, Jr. | G06Q 10/109 370/338 |

OTHER PUBLICATIONS

Anton et al., "Best Current Practices for Wireless Internet Service Provider", Wireless ISP Roaming, Feb. 1, 2003, pp. 1-37.

Chinese Office Action (5 pages) issued in corresponding Chinese Application No. 201380074106 dated Oct. 9, 2017 and English translation (3 pages).

Chinese Search Report (2 pages) issued in corresponding Chinese Application No. 201380074106 dated Oct. 9, 2017 and English translation (2 pages).

* cited by examiner

| Username | WiFi Network Password | Device Address |
|---|---|---|
| User A | netpass1 | 10.10.X.3 |
| User B | netpass2 | 10.10.Y.46 |

| Username | Device RegistrationID | 2nd Authentication password |
|---|---|---|
| userA | appToken_1 | L2Pass1 |
| userA | AppRegID_2 | L2Pass2 |
| userB | AppRegID_29 | L2Pass3 |

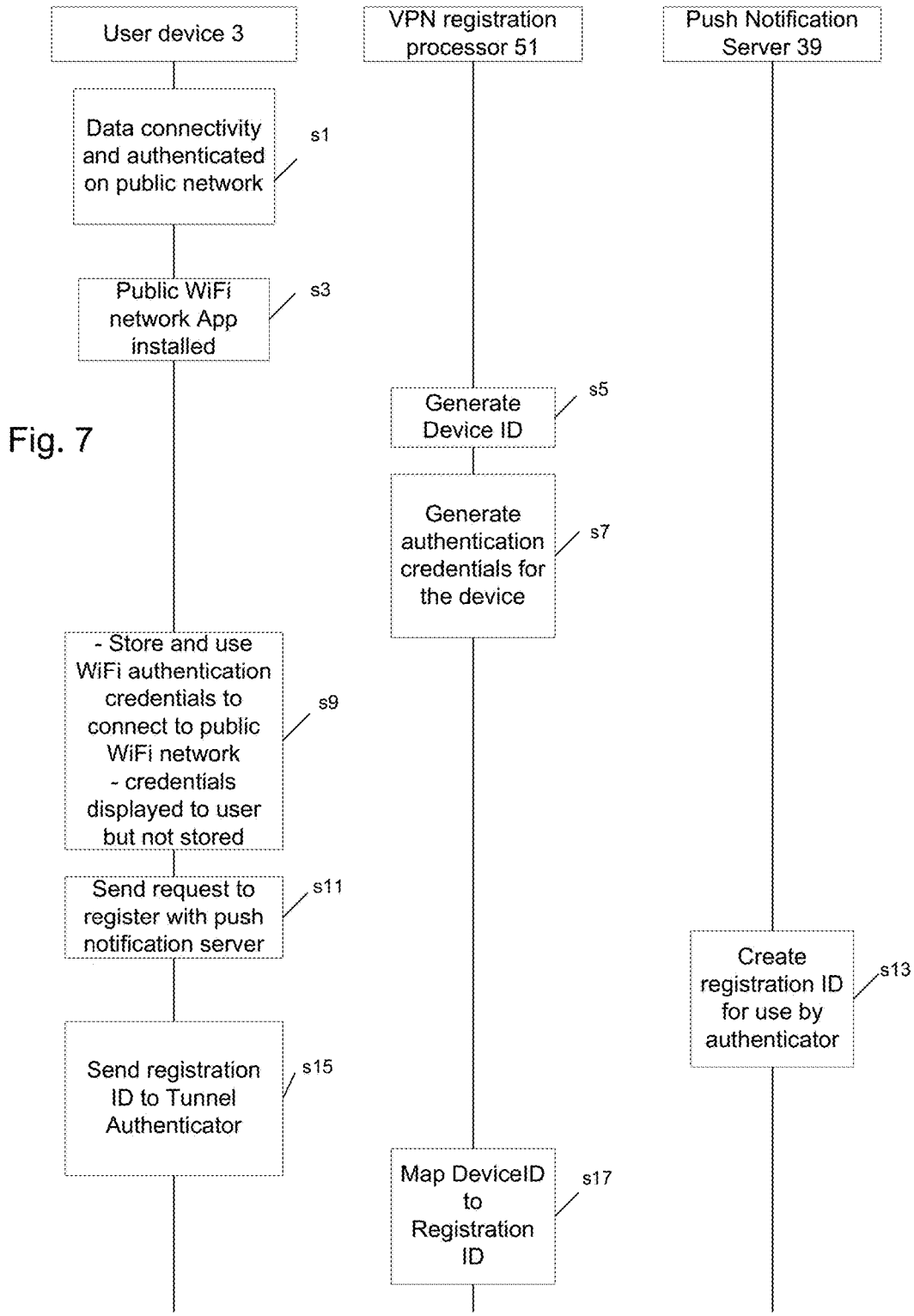

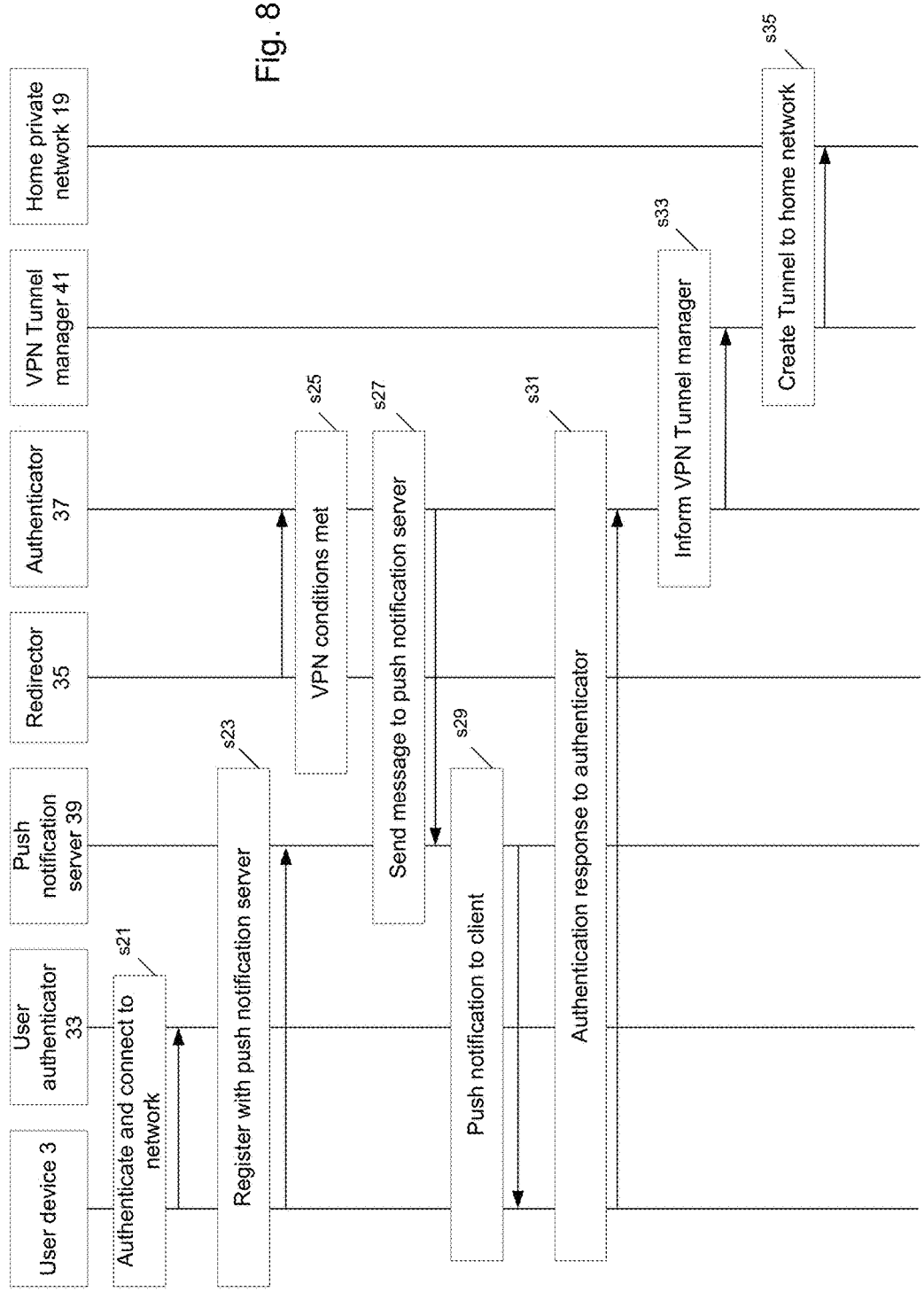

US 9,912,673 B2

METHOD AND DEVICE FOR SECURE NETWORK ACCESS

This application is the U.S. national phase of International Application No. PCT/GB2013/000570 filed 31 Dec. 2013, which designated the U.S. and claims priority to EP Patent Application No. 12250191.0 filed 31 Dec. 2012, the entire contents of each of which are hereby incorporated by reference.

The present invention relates to data networks and in particular to a method of securely authenticating access to a network resource.

BACKGROUND

Wi-Fi Networks

Many mobile devices such as cellular telephones and tablet devices now include wireless interface cards to enable them to communicate over a wireless communication channel in accordance with IEEE standards such as 802.11g, 802.11n and 802.11ac collectively known as Wi-Fi.

Whilst the Wi-Fi standards do provide for device-to-device ad-hoc wireless data links, typically an infrastructure architecture is adopted to form a local area network with an access point device acting as the central hub for the network. Each new device joining the wireless network connects to the access point and communication between devices can range from tens to hundreds of megabits of information per second but only within a limited physical distance from the access point. The access point device further forms an interface between the wireless local area network and an external wired wide area network such as the Internet.

Typically each access point is owned by a particular user and therefore enables connectivity over a limited geographical range for personal use and this is often defined as a home network. Often the devices on the home network wish to communicate with computing resources located on an external network such as the Internet, or a work private network. The data session with such computing resources pass via the access point device into an Internet Service Provider's core network before eventually arriving at the external network computing resource.

Typically data transmission within the home network is encrypted between authorised devices using a scheme such as the Wi-Fi Protected Access 2 (WPA2) protocol to prevent unauthorised access to the home network.

Hotspots

It is also known to create public hotspot networks in which many access points collectively form edge nodes to a public data network. An example of such a network is the BT Wi-Fi hotspot network operated by British Telecommunications plc. Even though the range of each individual access point is limited, by configuring each access point to have the same SSID, client devices can connect to different access points while maintaining data connectivity to the data network as they move around. Typically, each access point does not implement any encryption, and are therefore Open access points that any device can associate with. Authentication onto the data network is handled centrally at a higher network layer by an authentication server located in the core of the network. In the example case of the BT Wi-Fi network, the access points are open and do not implement any encryption for associating with the access points. However, user authentication is processed within the network core using RADIUS and IEEE 802.1x authentication.

Access Control

In order to establish a secure end to end connection between two network devices, it is known to use a Virtual Private Network (VPN) in order to tunnel packets from one end to the other, across a number of networks. However both parties wishing to use such a scheme must have VPN software installed which leads to extra complexity in the client.

The present invention addresses the above issues.

STATEMENTS OF INVENTION

In one aspect, the present invention provides a method of authenticating user access in a data packet network to a network resource, the method comprising: authenticating user access onto the data packet network based on a first set of authentication criteria; processing a request for the network resource from a network device associated the user; and authenticating the user and device access to the network resource based on a second set of authentication criteria.

In another aspect, the present invention provides an apparatus for authenticating user access in a data packet network to a network resource, comprising: a first authenticator for authenticating user access onto the data packet network based on a first set of authentication criteria; a processor for processing a request for the network resource from a network device associated the user; and a second stage authenticator for authenticating the user and device access to the network resource based on a second set of authentication criteria.

FIGURES

Figure 2:
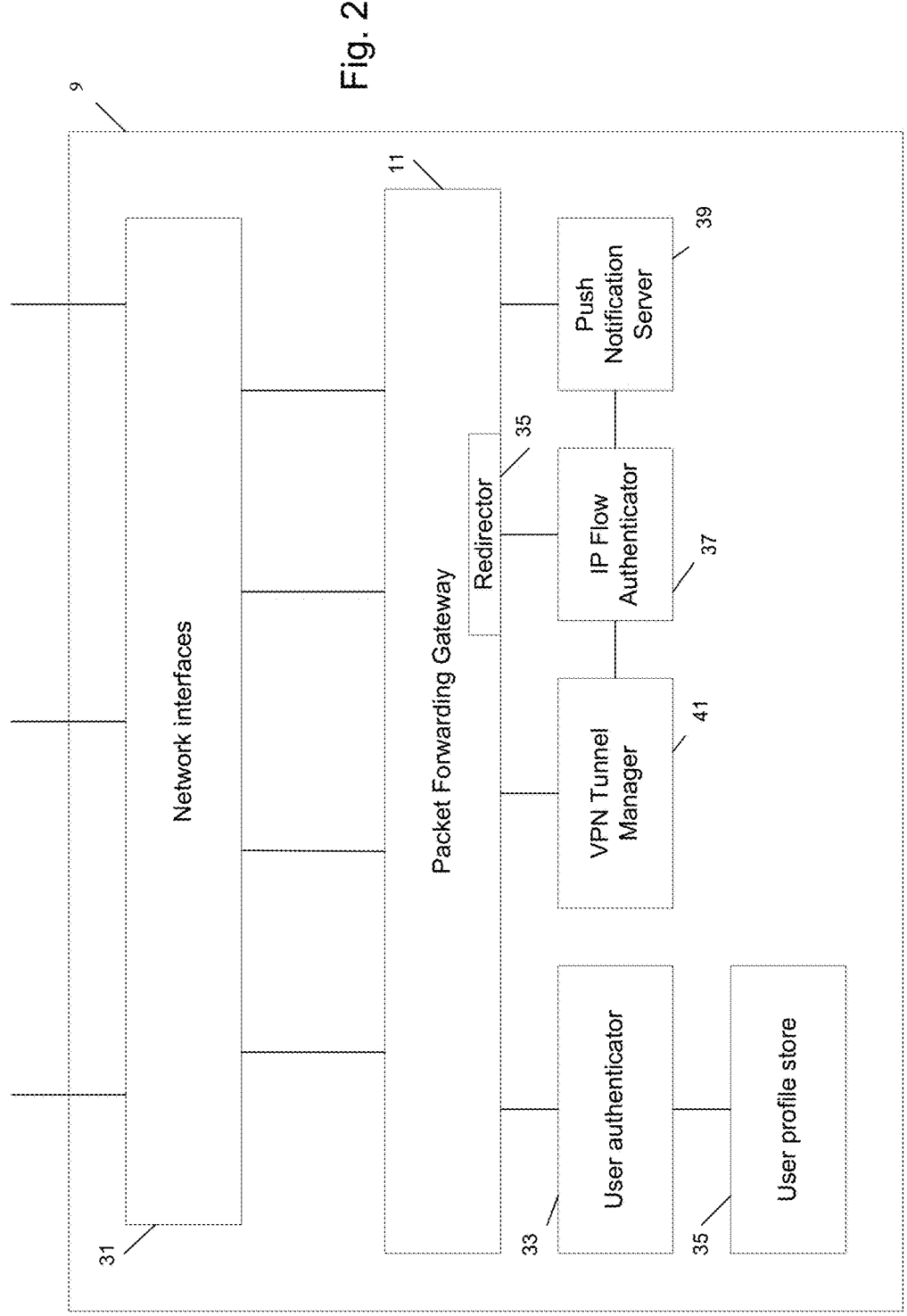
Figures 3, 4:
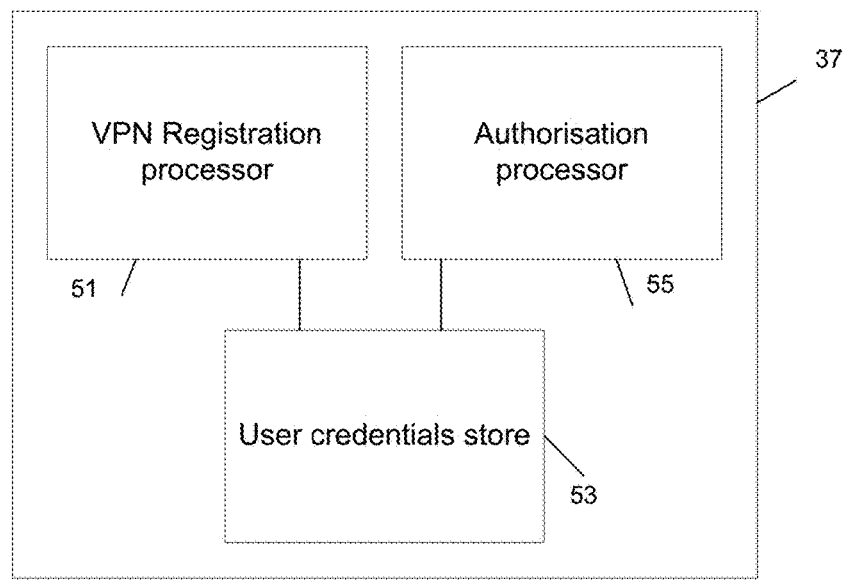
Figures 5, 6:
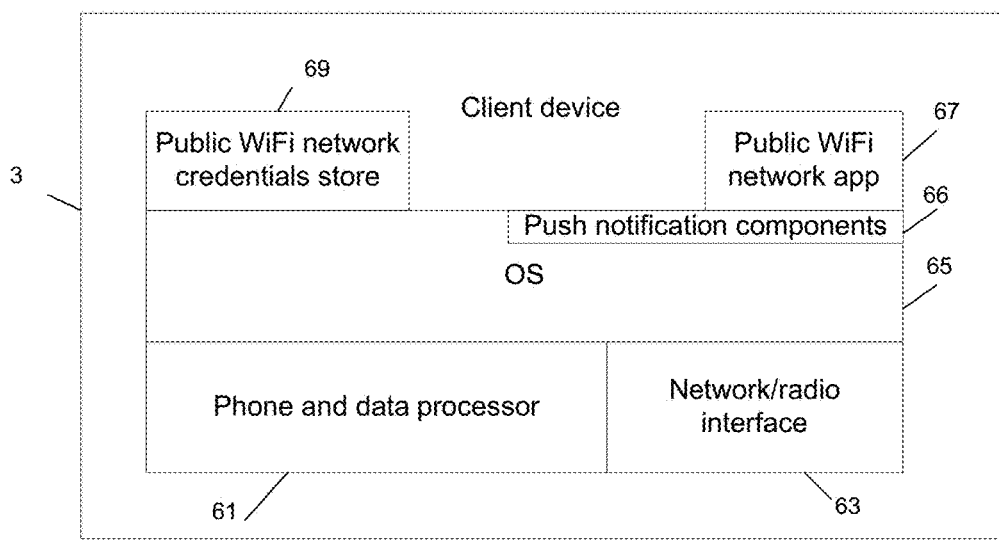

Embodiments of the present invention will now be described with reference to the accompanying Figures in which:

FIG. 1 schematically shows a data network in a first embodiment in which access control is centrally managed;

FIG. 2 schematically shows the components of the network core illustrated in FIG. 1 in more detail;

FIG. 3 schematically shows an example of the data stored in a user data store;

FIG. 4 schematically shows the main functional components of an IP flow authenticator in more detail;

FIG. 5 shows an example of the contents of the user credentials store;

FIG. 6 schematically shows the main functional components of a mobile device;

FIG. 7 is a flowchart showing the operation of the main functional components in the data network to register a new user for authentication; and FIG. 8 is a flowchart showing the operation of the main functional components in the data network when a user wishes to connect to their home network.

DESCRIPTION

FIG. 1 schematically shows a data network 1 in a first embodiment. A number of client devices 3 such as a laptop computer 3a and mobile telephones 3b, 3c connect using an 802.11 Wi-Fi protocol to an access point 5. In this example network, a first user owns laptop computer 3a and mobile phone 3*b* both connected to an access point 5*a* whilst a second user owns mobile telephone 3*c* and it is connected to access point 5*b*.

The access points 5 form part of a hotspot public data network 7 such as the BT Wi-Fi network managed by British Telecommunication plc. Each access point 5 is connected to a network core 9 via a wired connection technology. In this example only two access points 5 are shown for ease of explanation. However, for a broad geographical range, the hotspot network 7 would typically contain thousands of access points 5 located in various locations.

The network core 9 of the hotspot network 7 contains a packet forwarding gateway function 11 which routes data packets between client devices 3 and correspondent devices 13 located on a wide area network such as the Internet 15 in a conventional manner.

In the BT Wi-Fi network 7, home access point devices (hereinafter referred to as home hubs 17) have two functions, firstly to provide access to the Internet 15 for home network 19 devices located in a user's home 21, but also to act as access points to the public hotspot network 7 as if they were conventional public hotspot access points 5. In FIG. 1 a further wireless client device 3*d* is connected to the home hub 17*a*.

Due to the configuration of the home hubs 17, devices on the private home network 19 are separated from any devices connected to the public access point part of the home hub 17 for security reasons.

In FIG. 1, the first user and owner of devices 3*a* and 3*b* lives at home 21*a* but is currently away from home. The second user and owner of device 3*c* lives at home 21*b*. The owner of device 3*d* does not live at either home 21. As mentioned above, the configuration of the hotspot network 7 prevents device 3*d* from accessing the home network 19 managed by home hub 17. However in the first embodiment, the first user is able to access their home network 19 at their home 21 due to an improvement in the configuration of the network core, even though the first user is located at a different location within the hotspot network.

FIG. 2 shows the network core 9 in more detail. In addition to the packet forwarding gateway 11, the network core contains a network interface 31, a user authenticator 33, a user profile store 35, a redirector 35, an IP Flow authenticator 37, a push notification server 39 and a VPN Tunnel Manager 41.

The network interface 31 receives and sends data packets into and out of the network core 9 from user devices 3 connected to access points 5 or the hotspot network 7 side of the home hubs 17. Packets travel via the packet forwarding gateway function 11 which routes packets to the specified destination.

However, before the packet forwarding gateway function 11 will route packets, the user must be authenticated. In this hotspot system 7, client devices 3 can associate with the access points 5 without authenticating their identities since the access points 5 use Open Authentication. Once associated, the users must authenticate their identities on the hotspot network 7 before the packet forwarding gateway allows them to send data packets across the network core 9 to correspondent devices 13. This is carried out using a centralised authentication mechanism such as Captive Portal using usernames and password credentials or IEEE 802.1x based credential authentication.

The packet forwarding gateway function 11 monitors the traffic arriving at the network interface 31 and where the device/user identity corresponding to the source address is not known, the user is redirected on a web browser to a login page portal so that the user authenticator 33 can send an authentication challenge to the user's client device 3.

Once the user enters login credentials and transmits them back to the user authenticator 33, the user authenticator 33 checks the user profile store 35 and if the user's supplied login credentials match an entry in the user profile store 35, then the user authenticator 33 updates the packet forwarding gateway function 11 to allow data packet communication across the network core 9 to correspondent devices 13 located on the Internet 15. In this embodiment, the user authenticator 33 is a RADIUS server using 802.1x authentication.

FIG. 3 shows an example of the contents of the user profile store 35. In this example, user A and user B both have entries stored in a username and password field. Furthermore since both users have devices 3 connected to the hotspot network 7, the IP address of each connected device 3 is also stored in the user profile store 35 for the duration of the data session.

Once the user has successfully authenticated onto the hotspot network, the data session is carried out with only limited further intervention from the control entities within the network core 9 except for an occasional re-authentication routine after a set amount of time has elapsed or a threshold amount of data has been transferred.

However in the first embodiment, the redirector 35, flow authenticator 37, push notification server 39 and VPN tunnel manager 41 function to provide additional access control in particular situations for a user to access their own home network.

In particular, these elements allow a user to access their home private network while being connected to a different access point within the hotspot network 7 and without requiring dedicated Virtual Private Network (VPN) software installed on the user's client device. The establishment of VPN tunnels is controlled by the VPN Tunnel Manager 41 and the home hub 17 forming part of the user's home network 19.

Whilst a network managed connection to a user's home network 19 using the hotspot network 7 credentials can be very convenient, it can also present a security issue in certain situations. For example, if a user's phone is stolen, the thief would be able to gain access to the home network 19 if the hotspot network 7 credentials are stored in the mobile device 3 and set to automatically login to the hotspot network 7 within the same credentials. Furthermore some users will not want this function at all.

To address this issue, in the first embodiment, the establishment of the VPN connection to the home network 19 is disabled by default. Users requiring this feature must register for a second level of authentication and the user must further authenticate before the VPN tunnel to the home network 19 is formed.

The redirector 35 is configured to listen for certain criteria on the packet forwarding gateway 11 which may be indicative of a user requiring access to their home network 19. In this embodiment, the criteria is that a user has logged into the hotspot network. However, instead of launching the VPN tunnel network, the redirector calls the IP Flow authenticator 37.

FIG. 4 shows the IP flow authenticator 37 in more detail. The IP Flow authenticator 37 includes a VPN registration processor 51, a user credentials store 53 and an authorisation processor 55.

The VPN registration processor 51 allows an authorised user of the hotspot network 7 to register for the ability to access the VPN. During the registration process, the user provides a second set of login credentials which are different from the usual hotspot network 7 credentials stored in the user profile store 35. These new credentials are stored in user credentials store 53. Details of the registration phase will be described in more detail later.

FIG. 5 shows an example of the contents of the user credentials store 53 after the registration phase.

The user credential store 53 has data fields for a username, the device registration ID from the push notification server 39 and the user's further authentication password for the VPN connection to their home network 19.

In this example, since user A has both a laptop computer 3a and a mobile phone 3b, there are two entries in the user credential store 53 since each device is considered to be unique and therefore requires its own registration ID and password. However in other cases the user may wish to have the same password for all of their devices.

After the registration phase, the authorisation processor 55 uses the credentials in the user credentials store 53 to verify the user's entered details and a VPN tunnel to the user's home network 19 is only created if the credentials match.

Now that the main components of the network core 9 have been described, the client device architecture will be discussed.

FIG. 6 shows the main functional units of the mobile devices 3. Each mobile device has a data processor 61 and in the case of mobile telephones the data processor will also include cellular processes. A network interface 63 is also included to connect to the hotspot network 7 access points 5 via Wi-Fi. An operating system 65 is executed by the processor to provide functionality to the mobile device and includes push notification components 66 such as iOS APNS or Android C2DM/CGM. In an application layer above the operating system 65 there is a public Wi-Fi network app 67 to provide login details to the user authenticator 33 in the network core 9. The mobile device 3 also contains a public Wi-Fi network credentials store 69 for storing the credentials.

Registration

Now that the main components in the network have been described, the various interactions will now be explained.

FIG. 7 is a flowchart showing the processing interaction between the user's device, the VPN registration processor 51 in the IP flow authenticator 37 and the push notification server 39 in order to register a device for a VPN connection to the user's home network 19.

In step s1, the mobile device 3 has authenticated onto the hotspot network 7 using their user login credentials which have been verified by the user authenticator 33. In step s3, a network access app is installed on the mobile device 3 which enables it to interact with the VPN registration processor 51.

In response to the installation of the app, the VPN registration processor 51 generates a unique device ID in step s5 to identify the app and hence the mobile device on the hotspot network 7.

Furthermore in step s7 the VPN registration processor 51 generates authentication credentials for the device and sends these to the user device 3.

In step s9, the app stores the hotspot network authentication details in store 69 and displays but does not store the VPN password to the user since this information should not be stored on the device in case it becomes compromised.

In step s11, the mobile device 3 sends a registration request to the push notification server. The push notification server 39 is used to push messages to the mobile device using a third party push notification service such as iOS APNS or Android C2DM/CGM. In step s13 the push notification server 39 generates and returns a registration ID which is also unique to the mobile device 3 of the user.

In step s15; the mobile app 67 sends the registration ID to the VPN registration processor 51 so that the device ID and registration ID can be mapped and stored in step s17 and the registration process is complete.

Once the registration phase is complete, a user can use their registered mobile devices to securely access their home network.

Flow Authentication

FIG. 8 shows an exemplary interaction between the various components in the hotspot network to allow home network access.

In step s21, the registered mobile device authenticates with the user authenticator 33 to verify that they are allowed to enter the hotspot network 7 as described above.

After authentication, in step s23 the push notification component 66 of the OS sends a message to the push notification server 39 containing its previously assigned DeviceID in order to update the push notification server 39 so that it can continue to receive push notifications at its new network location.

In this embodiment, the redirector 35 is configured in step s25 to initiate the authentication as soon as the mobile device 3 starts communication on the network. In step s27, the flow authenticator 37 sends a specific message to the push notification server 39 for delivery to the mobile device app 67 in step s29. In this embodiment, the push notification message includes information to the user explaining the action to be performed in the form of a message or a link to the message such as a URL. Furthermore the message includes a nonce value that is used for security in step s31 where the user authenticates with the IP Flow authenticator 37 by supplying a password/pin. The password/pin is encrypted with the nonce to generate a hash value as a session key after the user is authenticated.

After authentication, in step s33 the flow authenticator 37 informs the VPN tunnel manager 41 to establish a VPN tunnel to the user's home network 19. This tunnel is established in step s35 and thereinafter in step s37 the redirector is configured to forward any packets destined for the home network address to be sent to the home network 19 while packets directed to correspondent nodes 13 on the Internet 15 are not affected.

In this embodiment, a multi stage authentication scheme is provided in order to allow a user to securely access their home network resources when they are not at home. Firstly they must be an authorised user on the hotspot network, secondly they must be in possession of a mobile device which has been registered with a second authenticator in the hotspot network and thirdly they must have a password which is not stored with the mobile device. Once these elements are together, then the hotspot network authenticates the user and instructs the VPN tunnel manager to create a VPN tunnel between the VPN tunnel manager 41 and a home hub 17 located in the user's home 21 and connected to their home network 19. Then a redirector 35 in the packet forwarding gateway selectively directs home bound traffic to the tunnel.

Alternatives and Modifications

In the embodiment, the redirector triggers the instantiation when the user connects to the hotspot network. Such behaviour is useful where the user always wishes to connect to the home network, e.g. business users. However, always enabling this feature can be inefficient utilisation of the network core if the users never actually use the home tunnel feature. Therefore in an alternative, the redirector trigger for forming the VPN is the detection of an actual desire by the use to access the home network. For example, if the user selects a function in the mobile device app or if packets are directed to home addresses.

In the embodiment, a push notification server was used to initiate contact with the mobile device to establish the tunnel. In an alternative, the user can navigate to a specific website or the access point can send the prompt to the user.

In the embodiment, the criterion for the redirector and second stage of authentication is to initialise a VPN to the user's home network. It will be appreciated to those skilled in the art that the behaviour of the redirector and authentication could be used for many different applications involving out of band signalling. For example, a personal network based firewall function can be achieved by specifying a range of IP addresses which are restricted and therefore without an authentication, cannot be accessed. An example of this would be for parental safeguards.

The invention claimed is:

1. A method of authenticating user access in a data packet network to a network resource, the data packet network having a plurality of access points configured to communicate with a network core to provide access to authorized users of the data packet network, the method comprising:
   authenticating user access onto the data packet network via one of said plurality of access points based on a first set of authentication criteria;
   processing a request for the network resource from a network device associated the user;
   authenticating the user and device access to the network resource based on a second set of authentication criteria; and
   in response to a successful authentication, establishing a secure data tunnel connection to the network resource, wherein:
   the network resource is a private network associated with the user and managed by at least one of the plurality of access points in the data packet network;
   the authentication based on the second set of authentication criteria is performed at a controller located in the data packet network;
   the secure data tunnel is established between said controller and the access point associated with the user's private network; and
   the second set of authentication criteria is a unique device identity and a second credential different from a first credential which constitutes at least a part of the first set of authentication criteria.

2. The method according to claim 1, wherein the first set of authentication criteria is a username and first password.

3. The method according to claim 1, wherein the data packet network is a hotspot network and the authentication of the first set of authentication criteria is performed at an authenticator located within the data packet network to enable access to the data packet network via any one of the plurality of access points.

4. A method of authenticating user access in a data packet network to a network resource, the data packet network having a plurality of access points configured to communicate with a network core to provide access to authorized users of the data packet network, the method comprising:
   authenticating user access onto the data packet network via one of said plurality of access points based on a first set of authentication criteria;
   processing a request for the network resource from a network device associated the user;
   authenticating the user and device access to the network resource based on a second set of authentication criteria; and
   in response to a successful authentication, establishing a secure data tunnel connection to the network resource, wherein:
   the network resource is a private network associated with the user and managed by at least one of the plurality of access points in the data packet network;
   the authentication based on the second set of authentication criteria is performed at a controller located in the data packet network;
   the secure data tunnel is established between said controller and the access point associated with the user's private network; and
   the method further comprises instructing a push notification server to initiate the authentication based on a second set of authentication criteria.

5. Apparatus for authenticating user access in a data packet network to a network resource, the data packet network having a plurality of access points configured to communicate with a network core to provide access to authorised users of the data packet network; comprising:
   a receiver for receiving a request for access to the data packet network from a network device via an access point to the data packet network;
   a first authenticator for authenticating user access onto the data packet network via a wireless access point based on a first set of authentication criteria;
   a hardware processor for processing a request for the network resource from a network device associated the user; and
   a second stage authenticator for authenticating the user and device access to the network resource based on a second set of authentication criteria; and
   a data tunnel establisher for securely establishing a secure data tunnel between the data packet network and the requested network resource in response to a successful authentication between the user and the network resource,
   wherein:
   the network resource is a private network associated with the user and managed by at least one of the plurality of access points in the data packet network;
   the second stage authenticator is located in the data packet network and the secure data tunnel is established between said second stage authenticator and the access point associated with the user's private network; and
   the second set of authentication criteria is a unique device identity and a second password different from a first password which constitutes at least a part of the first set of authentication criteria.

6. Apparatus according to claim 5, wherein the first set of authentication criteria is a username and first password.

7. Apparatus according to claim 5, wherein the data packet network is a hotspot network and the authentication of the first set of authentication criteria is performed at an authenticator located within the data packet networks to enable access to the data packet network via any one of the plurality of access points.

8. Apparatus for authenticating user access in a data packet network to a network resource, the data packet network having a plurality of access points configured to communicate with a network core to provide access to authorised users of the data packet network; comprising:
 a receiver for receiving a request for access to the data packet network from a network device via an access point to the data packet network;
 a first authenticator for authenticating user access onto the data packet network via a wireless access point based on a first set of authentication criteria;
 a hardware processor for processing a request for the network resource from a network device associated the user; and
 a second stage authenticator for authenticating the user and device access to the network resource based on a second set of authentication criteria; and
 a data tunnel establisher for securely establishing a secure data tunnel between the data packet network and the requested network resource in response to a successful authentication between the user and the network resource,
 wherein:
 the network resource is a private network associated with the user and managed by at least one of the plurality of access points in the data packet network;
 the second stage authenticator is located in the data packet network and the secure data tunnel is established between said second stage authenticator and the access point associated with the user's private network; and
 the apparatus further comprises a push notification server for initiating the authentication based on the second set of authentication criteria.

9. A system for authenticating user access in a data packet network to a network resource, comprising:
 a plurality of access points configured to communicate with a network core to provide access to authorised users of the data packet network;
 a receiver for receiving a request for access to the data packet network from a network device via an access point to the packet data network;
 a first authenticator for authenticating user access onto the data packet network via a wireless access point based on a first set of authentication criteria;
 a hardware processor for processing a request for the network resource from a network device associated the user;
 a second stage authenticator for authenticating the user and device access to the network resource based on a second set of authentication criteria; and
 a data tunnel establisher for securely establishing a secure data tunnel between the data packet network and the requested network resource in response to a successful authentication between the user and the network resource
 wherein:
 the network resource is a private network associated with the user and managed by at least one of the plurality of access points in the data packet network;
 the second stage authenticator is located in the data packet network and the secure data tunnel is established between said second stage authenticator and the access point associated with the user's private network; and the second set of authentication criteria is a unique device identity and a second password different from a first password which constitutes at least a part of the first set of authentication criteria.

10. The system according to claim 9, wherein the first set of authentication criteria is a username and first password.

11. The system according to claim 9, wherein the data packet network is a hotspot wireless network.

12. A system for authenticating user access in a data packet network to a network resource, comprising:
 a plurality of access points configured to communicate with a network core to provide access to authorised users of the data packet network;
 a receiver for receiving a request for access to the data packet network from a network device via an access point to the packet data network;
 a first authenticator for authenticating user access onto the data packet network via a wireless access point based on a first set of authentication criteria;
 a hardware processor for processing a request for the network resource from a network device associated the user;
 a second stage authenticator for authenticating the user and device access to the network resource based on a second set of authentication criteria; and
 a data tunnel establisher for securely establishing a secure data tunnel between the data packet network and the requested network resource in response to a successful authentication between the user and the network resource
 wherein:
 the network resource is a private network associated with the user and managed by at least one of the plurality of access points in the data packet network;
 the second stage authenticator is located in the data packet network and the secure data tunnel is established between said second stage authenticator and the access point associated with the user's private network; and
 the system further comprises a push notification server for initiating the authentication based on the second set of authentication criteria.

13. An apparatus for authenticating user access in a data packet network to a network resource, the data packet network having a plurality of access points configured to communicate with a network core to provide access to authorized users of the data packet network; the apparatus comprising:
 an interface configured to receive a request for access to the data packet network from a network device via an access point to the data packet network; and
 a computer hardware processing system at least configured to:
  perform a first authentication for authenticating user access onto the data packet network via a wireless access point based on a first set of authentication criteria;
  process a request for the network resource from a network device associated the user; and
  perform a second stage authentication for authenticating the user and device access to the network resource based on a second set of authentication criteria; and
  establish a secure data tunnel between the data packet network and the requested network resource in response to a successful authentication between the user and the network resource,
 wherein:

the network resource is a private network associated with the user and managed by at least one of the plurality of access points in the data packet network;

a hardware processor, of the computer hardware processing system, for performing the second stage authentication is located in the data packet network and the secure data tunnel is established between the hardware processor performing the second stage authentication and the access point associated with the user's private network; and the second set of authentication criteria is a unique device identity and a second password different from a first password which constitutes at least a part of the first set of authentication criteria.

14. The apparatus according to claim 13, wherein the first set of authentication criteria is a username and first password.

15. The apparatus according to claim 13, wherein the data packet network is a hotspot network and the authentication of the first set of authentication criteria is performed at the processing system performing the authentication located within the data packet networks to enable access to the data packet network via any one of the plurality of access points.

16. An apparatus for authenticating user access in a data packet network to a network resource, the data packet network having a plurality of access points configured to communicate with a network core to provide access to authorized users of the data packet network; the apparatus comprising:

an interface configured to receive a request for access to the data packet network from a network device via an access point to the data packet network; and a computer hardware processing system at least configured to:

perform a first authentication for authenticating user access onto the data packet network via a wireless access point based on a first set of authentication criteria;

process a request for the network resource from a network device associated the user; and perform a second stage authentication for authenticating the user and device access to the network resource based on a second set of authentication criteria; and establish a secure data tunnel between the data packet network and the requested network resource in response to a successful authentication between the user and the network resource, wherein:

the network resource is a private network associated with the user and managed by at least one of the plurality of access points in the data packet network;

a hardware processor, of the computer hardware processing system, for performing the second stage authentication is located in the data packet network and the secure data tunnel is established between the hardware processor performing the second stage authentication and the access point associated with the user's private network; and the processing system is further configured to provide a push notification for initiating the authentication based on the second set of authentication criteria.

* * * * *